(12) United States Patent
Blass et al.

(10) Patent No.: US 7,747,446 B2
(45) Date of Patent: Jun. 29, 2010

(54) VOICE RECOGNITION INTERACTIVE SYSTEM WITH A CONFIRMATION CAPABILITY

(75) Inventors: Oscar J. Blass, Boynton Beach, FL (US); Musaed A. Almutawa, Delray Beach, FL (US); Paritosh D. Patel, Parkland, FL (US); Robert Vila, Hollywood, FL (US)

(73) Assignee: Nuance Communications, Inc., Burlington, MA (US)

( * ) Notice: Subject to any disclaimer, the term of this patent is extended or adjusted under 35 U.S.C. 154(b) by 846 days.

(21) Appl. No.: 11/609,667

(22) Filed: Dec. 12, 2006

(65) Prior Publication Data

US 2008/0140400 A1 Jun. 12, 2008

(51) Int. Cl.
*G10L 21/06* (2006.01)
(52) U.S. Cl. .................................................. 704/275
(58) Field of Classification Search ................... 704/275
See application file for complete search history.

(56) References Cited

U.S. PATENT DOCUMENTS

| | | | |
|---|---|---|---|
| 6,804,653 B2 | 10/2004 | Gabel | |
| 6,988,070 B2 * | 1/2006 | Kawasaki et al. | 704/275 |
| 7,240,010 B2 * | 7/2007 | Papadimitriou et al. | 704/275 |
| 7,418,281 B2 * | 8/2008 | Guyette | 455/575.6 |
| 2003/0053434 A1 | 3/2003 | Chow et al. | |
| 2003/0207701 A1 | 11/2003 | Rolnik et al. | |
| 2004/0022208 A1 | 2/2004 | Dahod et al. | |
| 2004/0117459 A1 | 6/2004 | Fry | |
| 2004/0230659 A1 | 11/2004 | Chase | |
| 2005/0114132 A1 | 5/2005 | Hsu | |
| 2005/0124364 A1 | 6/2005 | Rao et al. | |
| 2005/0141511 A1 | 6/2005 | Gopal | |
| 2005/0182631 A1 | 8/2005 | Lee et al. | |
| 2006/0094455 A1 | 5/2006 | Hannu et al. | |

OTHER PUBLICATIONS

Schmandt et al., "Impromptu: Managing Networked Audio Applications for Mobile Users," MobiSYS'04, Boston, Massachusetts, Jun. 6-9, 2004.

* cited by examiner

*Primary Examiner*—Susan McFadden
(74) *Attorney, Agent, or Firm*—Wolf, Greenfield & Sacks, P.C.

(57) ABSTRACT

A system and method for voice recognition interaction is provided. The system can have a processor for receiving a voice signal and determining a command based on the voice signal. The system can also have a confirmation interface operably connected to the processor, where the confirmation interface is capable of receiving a confirmation signal from a user and providing the confirmation signal to the processor. The system can have a user identifying device for determining an identity of the user. The processor can determine a confirmation criteria based at least in part on the identity of the user or a type of the command. The satisfaction of the confirmation criteria can be applied to allow or prevent performance of the command.

20 Claims, 5 Drawing Sheets

VOICE RECOGNITION INTERACTIVE SYSTEM WITH A CONFIRMATION CAPABILITY

FIELD OF THE INVENTION

This invention relates to voice recognition, and particularly to a voice recognition interactive system having command confirmation safeguards.

BACKGROUND OF THE INVENTION

Voice recognition systems are known and their use is increasing in popularity. Such systems can be incorporated into interactive systems for carrying out selected automated commands. These systems are increasingly being used in environments that are not solely populated by the user, such as in automobiles. Where multiple user environments exist, a concern arises as to the voice recognition and interactive system performing an unwanted command, either through erroneous recognition of the command or performance of a command issued by an unauthorized user. Unwanted performance of commands can be particularly dangerous in environments such as automobiles.

In a Free-to-Talk voice interactive system, the device is always in an active standby state, and there is no requirement to perform a user-initiated action before issuing a voice command. Input voice signals are always considered by the voice interactive system as voice commands and the likelihood of unwanted commands being performed is increased with noisier environments.

Contemporary voice recognition and interactive systems have sought to address these concerns through activation requirements for operation of the system. Two such voice recognition and interactive systems are Push-to-Talk systems and Talk-to-Talk systems. Push-to-Talk voice interactive systems require a user-initiated physical actuation to activate the system each time before a voice command can be evaluated by the device. Talk-to-Talk voice interactive systems require a keyword to be spoken to activate the system each time before a voice command can be evaluated by the device.

However, neither the Push-to-Talk or Talk-to-Talk voice interactive systems provide any safeguard once the system has been activated. Noise or unauthorized commands subsequent to the actuation steps described above can still result in the performance of unwanted commands by the interactive system. Additionally, such systems can be disadvantageous in certain situations because of the physical actuation being required and can be disadvantageous in other situations because of the physical or verbal initiation step being required prior to each activation of the system.

The Push-to-Talk or Talk-to-Talk voice interactive systems require the physical or verbal actuation steps described-above regardless of the particular command that will be issued by the user. Such an inflexible system is not user friendly and creates inefficiencies in the system.

In other contemporary voice interactive systems, the physical actuation step has been completely eliminated and only a single keyword is required to be spoken to enable the device prior to issuing a series of commands to the device. Such contemporary devices use an idle time technique to determine whether another keyword must be spoken to enable the device prior to issuing more commands to the device. However, these systems still suffer from the drawback of being susceptible to performance of unwanted commands once the single keyword has been spoken. Additionally, the use of the single keyword can be problematic where unauthorized users learn of the keyword. For example, in an automobile where passengers are present, a keyword may be repeated by passengers, e.g., a child, resulting in the potential of unwanted performance of automated commands by the interactive system.

A need therefore exists for a system and method for voice interactive systems wherein the above-mentioned disadvantages may be alleviated. A further need exists for such a system that provides sufficient safeguards against unwanted performance of commands while maintaining the efficiency of the system. An additional need exists for such a system that can apply varying levels of safeguards based upon the particular command being issued. An efficient, safe and secure voice interactive system is necessary to encourage adoption of such systems in pervasive environments.

BRIEF SUMMARY OF THE INVENTION

A voice interactive system is provided in the exemplary embodiments that imposes safeguards in the operation of the system to avoid unwanted performance of commands. Such safeguards prevent both unintentional and malicious commands being performed. An efficient and secure voice interactive system of the exemplary embodiments is provided that encourages adoption of these systems in pervasive environments. The voice interactive system of the exemplary embodiments can apply varying levels of safeguards based upon the particular command being issued and/or based upon the user identity to provide a flexible, efficient and user-friendly system.

In one exemplary embodiment of the present invention, there is provided a voice recognition interactive system operably connected to a device. The system comprises a processor for receiving a voice signal from a user and determining a command based on the voice signal; a confirmation interface operably connected to the processor and capable of receiving a confirmation signal and providing the confirmation signal to the processor; and a user identifying device for determining an identity of the user. The processor determines a confirmation criteria based at least in part on the identity of the user. The processor determines if the confirmation criteria has been satisfied. The processor allows or prevents performance of the command by the device based at least in part on satisfaction of the confirmation criteria.

Another embodiment is a computer readable program embodied in an article of manufacture comprising computer readable program instructions for confirming a command in a voice recognition interactive system that is operably connected to a device. The program comprises program instructions for causing a computer to determine at least one of an identification of a user and a type of the command; program instructions for causing the computer to determine a confirmation criteria for performance of the command based at least in part on at least one of the identification of the user and the type of the command; and program instructions for causing the computer to allow or prevent the performance of the command by the device based at least in part on satisfaction of the confirmation criteria.

Yet another embodiment is a method of voice recognition interaction with a device. The method comprises receiving a voice signal from a user; determining a command to be performed by the device based on the voice signal; determining at least one of an identity of the user and a type of the command to be performed; determining a confirmation criteria based at least in part on at least one of the identity of the user and the type of the command to be performed; and allowing or preventing performance of the command by the device based on satisfaction of the confirmation criteria.

BRIEF DESCRIPTION OF THE DRAWINGS

Exemplary embodiments of the voice interactive system will now be described, by way of example only, with reference to the accompanying drawings, in which.

DETAILED DESCRIPTION OF THE INVENTION

Exemplary embodiments described herein address the shortcomings of prior voice recognition interactive systems by providing confirmation safeguards for performance of commands. Exemplary embodiments will be explained in connection with various possible voice recognition interactive systems and methods, but the detailed description is intended only as exemplary. Exemplary embodiments will be shown in FIGS. 1-5, but the present disclosure is not limited to the illustrated structure or application.

Figure 1:
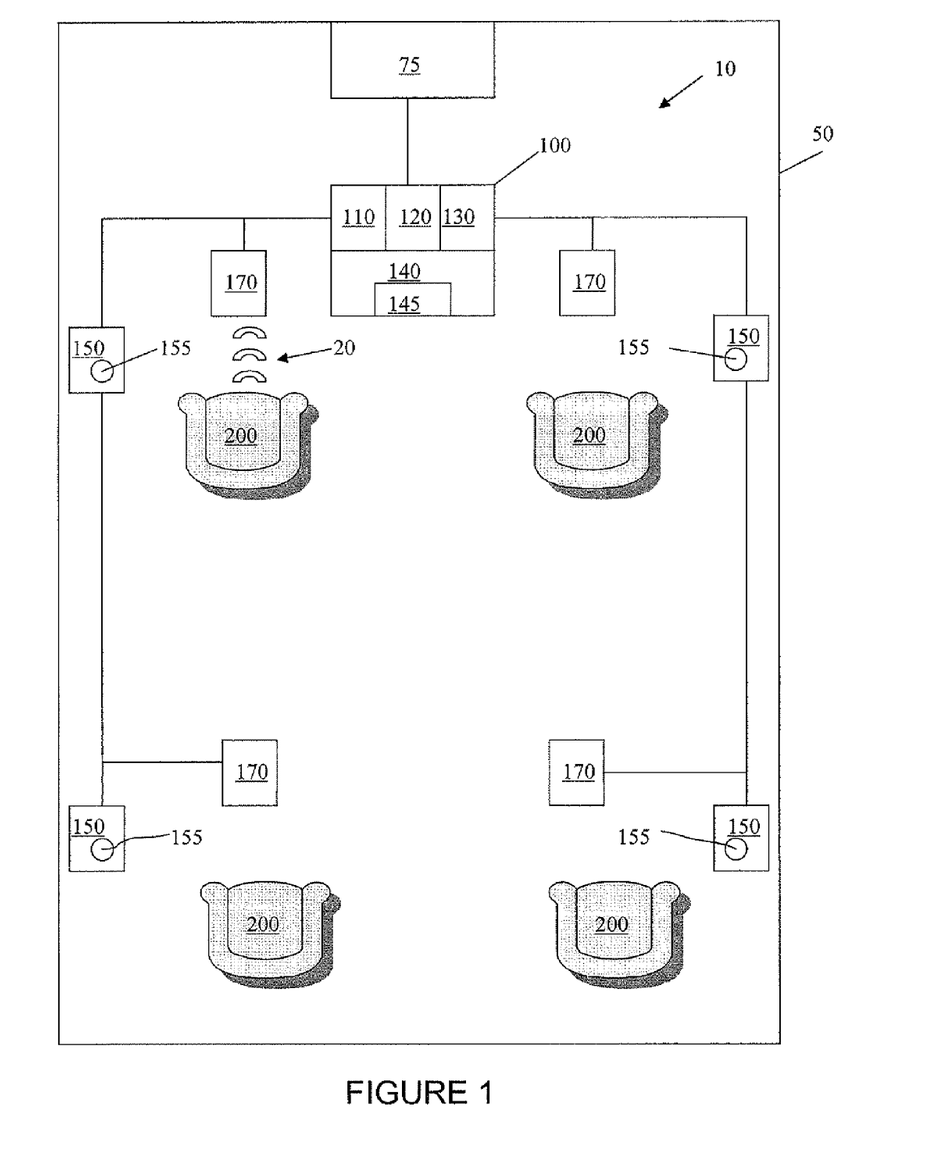
FIG. 1 is a schematic representation of a voice interactive system according to an exemplary embodiment of the invention.

Referring to FIG. 1, a voice recognition interactive system is shown and generally represented by reference numeral 10. System 10 has one or more components that receive a voice or speech signal 20 and process that signal to identify words or other audio communications. In the exemplary embodiment, system 10 is used in an automobile 50. However, it should be understood that system 10 can be used in various mobile environments including planes, boats and the like, as well as immobile environments, such as homes, commercial and industrial facilitates, control booths and the like. The exemplary embodiment of system 10 and the voice recognition interaction that will be described later in greater detail is not intended to be limited to a particular type of environment or to a particular type of device that can perform the commands.

System 10 is preferably in communication with a control system or microprocessor 75 of the environment, e.g., automobile 50, for the automated performance of one or more commands, such as, locking, unlocking, opening and/or closing doors, windows, hoods and/or trunks; navigation, audio, and/or video control; and/or telephone control. The particular type of performance, including active performance, e.g., unlocking a door, and passive performance, e.g., allowing unlocking of the door, can be varied according to the particular environment where system 10 is being used and is not intended to be limiting of the exemplary embodiment.

System 10 can have a controller, control sub-system or other processing device 100 having a processor 110, one or more memory devices 120, a user interface 130 and a voice recognition module 140. The processor 110 can be comprised of any suitable microprocessor, central processing unit or other electronic processing unit, as is well known to those skilled in the art, including, but not limited to, computers, microcontrollers, microcomputers, programmable logic controllers, application specific integrated circuits, and other programmable circuits. Memory devices 120 can include non-volatile memory (e.g., read-only memory) and/or volatile memory (e.g., random elements that comprise access memory (RAM)). While controller 100 is described in the exemplary embodiment as having separate processor 10, memory devices 120, user interface 130 and voice recognition module 140, it should be understood that the present disclosure contemplates having an integrated system 10 or controller 100, as well as having a distributed system.

Processor 110 and/or controller 100 is preferably in communication with microprocessor 75 of automobile 50 for performance of verbal commands issued to the system 10. System 10 can have various other circuitry and components for processing the voice recognized commands based upon signals 20 and carrying out the requested performance in connection with microprocessor 75 of automobile 50. The particular communication between voice recognition interactive system 10 and microprocessor 75 of automobile 50 can be via hardwire connections and/or through wireless communications, such as, for example, Bluetooth®. Additionally, while the exemplary embodiment of system 10 is in communication with microprocessor 75 for the performance of various commands by automobile 50, the present disclosure contemplates system 10 being in communication with any number of other devices, including control devices, and also contemplates system 10 being in direct communication with actuating devices of automobile 50 or any other environment for performance of the voice recognized commands based upon signals 20.

Various other circuitry and components can be used for receiving and processing of verbal signals 20, including, but not limited to, circuitry for converting analog audio input signals to digital audio data, and digital audio data to analog audio output signals and other audio interface circuitry. Voice recognition module 140 can have a speaker 145, operatively connected to the processor 110 or other components of controller 100 through suitable audio interface circuitry. The voice recognition module 140 can include other components that allow for receipt of voice signal 20 and processing of that signal to identify words or other audio communications.

Controller 100 can include an operating system, a speech recognition engine application, and a speech enabled application. In operation, analog audio signals representative of sound received in directional microphones 170 are processed within the processor 110 using the audio circuitry, e.g., the voice recognition module 140, so as to be made available to the operating system in digitized form. The audio signals received by the processor 110 can be conventionally provided to the speech recognition engine application via the operating system in order to perform speech recognition functions. As in conventional speech recognition systems, the digital audio signals are processed by the speech recognition engine application to identify words or other audio communications spoken by the user. It should be understood by one of ordinary skill in the art that controller 100 can perform one or more of the functions of speech recognition, user identification, confirmation criteria determination, confirmation criteria satisfaction, performance actuation and confirmation criteria indication using the components described herein, as well as through use of any other suitable components. Computer program instructions can be provided through removable memory, and/or communications with other sources. Alternatively, or additionally, the system 10 can utilize an embedded architecture.

Controller 100 can also can provide audio output through speaker 145. Moreover, the processor may also provide speech audio output through speaker 145 using digitized speech audio samples produced by a conventional text-to-speech (TTS) engine (not shown) in association with the speech recognition engine application and the speech enabled application.

Controller 100 is preferably in communication with a confirmation interface that allows a user to provide a confirmation signal to the system 10. In the exemplary embodiment of FIG. 1, the confirmation interface comprises one or more control pads or control buttons 150. System 10 can have distributed control pads 150 in the automobile 50 at readily accessible positions for the operator and passengers. Four such control pads 150 are shown in FIG. 1, which correspond to the number of potential users 200 of system 10. The particular configuration and number of control pads 150 can be varied to facilitate operation of system 10 and can vary depending upon the particular environment and/or potential users in the environment. The control pads 150 are in communication with controller 100 for sending confirmation signals to the processor 110 as will be described later in greater detail. The particular type of communication between control pads 150 and controller 100 can be via hardwire connections and/or through wireless communications. Various components can be used for control pads 150 that allow for the sending of the confirmation signals to the processor 110 and the present disclosure contemplates the control pads being movable, including remote and limited movement, for the comfort of the user.

System 10 can have a Push-to-Talk (PTT) Button 155 which can be operatively connected to, and in communication with, the controller 100. The PTT Button 155 can be a button which, when depressed, indicates to the controller 100 that the user is going to provide analog speech input to the audio input circuitry for conversion to computer readable text by a speech recognition engine, e.g., a recognizer ready state. An example of such a PTT Button is shown in commonly owned U.S. Pat. No. 6,804,653 to Gabel, the disclosure of which is hereby incorporated in its entirety by reference. In the exemplary embodiment of FIG. 1, PTT Button 155 is positioned with control pad 150 so as to be readily accessible to the user. The control pad 150 can have additional buttons (not shown) that are dedicated to sending the confirmation signal, including a cancellation signal. The present disclosure also contemplates the PTT Button 155 serving to provide the controller with both the recognizer ready state signal and the confirmation signal. Other locations for the PTT Button 155 can be provided, including in proximity to the controller 100.

Controller 100 can identify the user and can determine a confirmation criteria which may be based at least in part on the user who has issued the command. In the exemplary embodiment, the controller 100 is preferably in communication with one or more voice location devices 170 that are used to determine the location or point of origin of the voice signal 20. However, the present disclosure contemplates identifying the user or a category of users by other techniques or processes, including biometrics, multiple distributed PTT buttons, speaker verification and age determination.

In the exemplary embodiment of FIG. 1, system 10 uses directional microphones for location devices 170. The particular type of directional microphone 170 can be chosen to facilitate the point of origin determination, such as a pressure-gradient transducer device. Other sound locating devices 170 can also be used for the point of origin determination of the voice signal 20, for example distributed microphones can be tuned to only detect sounds within close proximity so that a particular microphone detecting the sound is indicative of the user based upon where the microphone is positioned in the environment, e.g., front driver seat, front passenger seat and rear passenger seats. The present disclosure also contemplates the use of other devices and/or techniques for locating the point of origin of voice signal 20, such as, for example, imaging recognition devices. The directional microphones 170 can each be used for receiving and processing voice signal 20 as multiple signals, where the processor 110 can compare each of the multiple signals to determine the point of origin, such as, for example, by strength or direction of signal.

In the exemplary embodiment shown in FIG. 1, system 10 has distributed directional microphones 170 in the automobile 50 in proximity to each of the users 200. The particular position of each of the directional microphones 170 with respect to each of the users 200 can be chosen to facilitate the comparison and determination of the point of origin of the signal 20, for example by distance and attenuation comparisons of each of the multiple signals. Four such directional microphones 170 are shown in FIG. 1, which correspond to the number of potential users 200 of system 10. The particular configuration and number of directional microphones 170 can be varied to facilitate operation of system 10 and will vary depending upon the particular environment and/or potential users in the environment.

The directional microphones 170 are in communication with controller 100 for sending data representative of the multiple signals of the voice signal 20 to the processor 110 as described above, but the present disclosure also contemplates the location devices 170 performing the point of origin determination and sending the determination to the processor. Such a system provides for error reduction through redundancy by having the point of origin determination made by each of the location devices 170, which can be compared by the processor 110. The particular type of communication between directional microphones 170 and controller 100 can be via hardwire connections and/or through wireless communications. Various components can be used for directional microphones 170 that allow for the receiving and processing of voice signal 20 as multiple signals and the present disclosure contemplates the directional microphones being movable, including remote and limited movement. In certain environments, the point of origin determination of voice signal 20 by system 10 is complicated by noise and sound reflection, such as in confined spaces, e.g., automobile 50. The present disclosure contemplates filters, filtering techniques and the like being utilized by system 10 to account for such noise and sound reflection in processing the point of origin determination of the voice signal 20.

Figure 2:
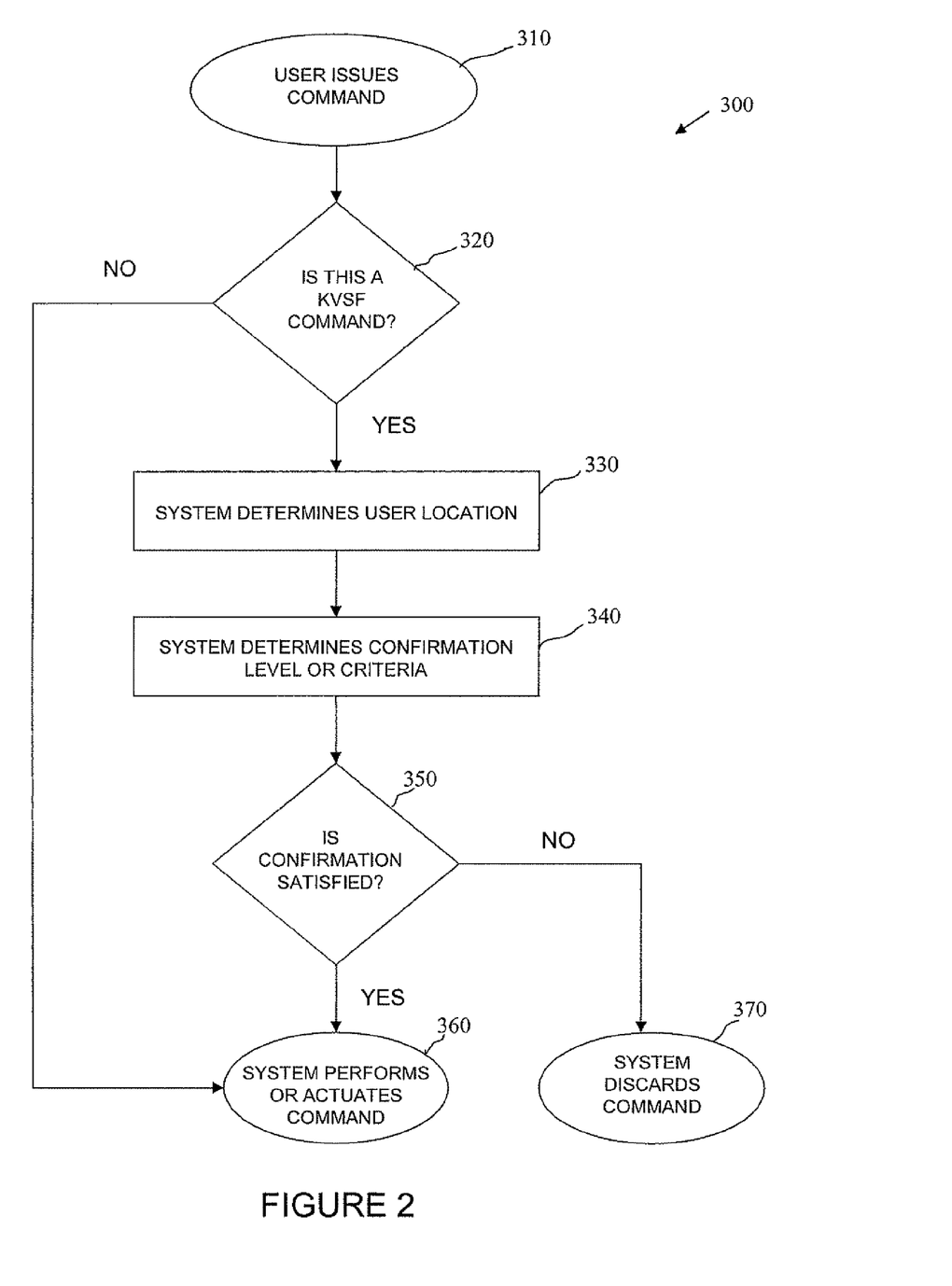
FIG. 2 is a flow chart illustrating an exemplary embodiment of voice interaction that can be carried out by the system of FIG. 1.

Referring additionally to FIG. 2, a method of using location based confirmation levels and command type confirmation levels is shown and generally referred to by reference numeral 300. System 10 can utilize a confirmation method based at least in part on the location or point of origin of the voice signal 20 which can be determined by location devices 170 and/or controller 100 as described above. System 10 can determine the type of command being issued by the user and determine a confirmation level or criteria, if one is necessary at all, based upon the command type. The varying of the confirmation level or criteria based upon the type of command can be used in combination with the location based confirmation levels described above. Alternatively, these methods can be used separately.

After a command is issued by one of the users as in step 310, system 10 can determine whether the command is a key voice system function (KVSF) as in step 320. KVSF commands are typically those commands that can have a potentially harmful or detrimental effect on the occupants of the environment and/or the environment itself if an unwanted performance occurs. The present disclosure also contemplates other command type designations being used for determining a confirmation level or criteria. Designation of a command as KVSF can be predetermined and/or can be implemented through user configuration options for system 10, such as through user interface 130. The processor can have a database or listing, and/or can be in communication with a database or listing, of command types, e.g., KVSF commands, for determining the type of command being issued by the user 200. If the command is not a KVSF or is of a type that is determined to be immediately performable, the system 10 can perform the command or communicate with microprocessor 75 of automobile 50 to actuate the performance of the command without satisfaction of any confirmation criteria.

If a KVSF command has been issued, then in step 330 the system 10 determines the user location. In the exemplary embodiment, system 10 uses confirmation levels or criteria that vary depending upon the user, e.g., there can be a different level or criteria of confirmation for each of the operator, the front seat passenger and the back seat passengers, with the user being determined based on the point of origin determination. Depending on the particular environment, e.g., the type of vehicle or where the driver is located based on nationalistic differences, the user determination via point of origin can be adjusted.

System 10 preferably provides for one or more configuration options which can include adjustment to the point of origin determination of the user based upon the type of environment, e.g., whether the automobile has a left-side or right-side driver. The configuration options can be adjusted using the user interface 130 or by other means. While the exemplary embodiment of system 10 describes the primary user as the operator or driver of automobile 50, it should be understood that the designation of one or more primary users depends upon the particular environment in which system 10 is operating. For example, in a control booth environment the primary user(s) can be selected or chosen based upon his or her responsibility for control. Moreover, the particular location of the primary user can be selected or chosen based upon where the primary user has chosen to be located in the control booth.

In step 340, system 10 determines the confirmation level or criteria based on at least one of the type of command (e.g., KVSF) and the user location. Preferably, system 10 determines the confirmation level or criteria based on both the type of command (e.g., KVSF) and the user location or other user identification process.

One example of a confirmation criteria or a portion of the confirmation criteria is where system 10 applies an operator override time (OOT) to performance of the KVSF command. If an OOT is applied, system 10 would allow the operator to cancel the command within a particular time limit via a cancellation signal. The time limit for overriding the command can vary depending upon the type of command to be performed. The type of override signal can vary.

In an exemplary embodiment, an override or cancellation signal can be provided to controller 100 by the pressing of control pad 150 or PTT button 155. However, the present disclosure contemplates the use of other override signals, as well as other structures and methodology for providing the override signals, including verbal override signals. The present disclosure also contemplates the override signal being issued by someone other than the operator. For example, a passenger may issue a KVSF command to the controller 10 and during the OOT, the operator may cancel the KVSF command through an override signal. The present disclosure also contemplates other users, for example a passenger, providing an override signal to a KVSF command issued by the operator or other passengers. The override signal can also be provided by the user who issued the KVSF command, such as where the user has determined during the OOT that the command is no longer necessary.

In step 350, system 10 determines if the confirmation criteria has been satisfied. If the confirmation is satisfied, the system 10 can perform the command or communicate with microprocessor 75 of automobile 50 to actuate the performance of the command, as in step 360. Failure to satisfy the confirmation will result in the command being discarded or otherwise not performed by system 10 and/or microprocessor 75 of automobile 50, as in step 370. It should be understood that the present disclosure contemplates various criteria for satisfying the confirmation of a user command. The criteria can be active which requires that the user and/or someone else provide a confirmation signal otherwise the command is discarded. The criteria can be passive which results in the command being performed unless an override signal or other cancellation communication is provided to the system 10 by the user and/or someone else.

Figure 3:
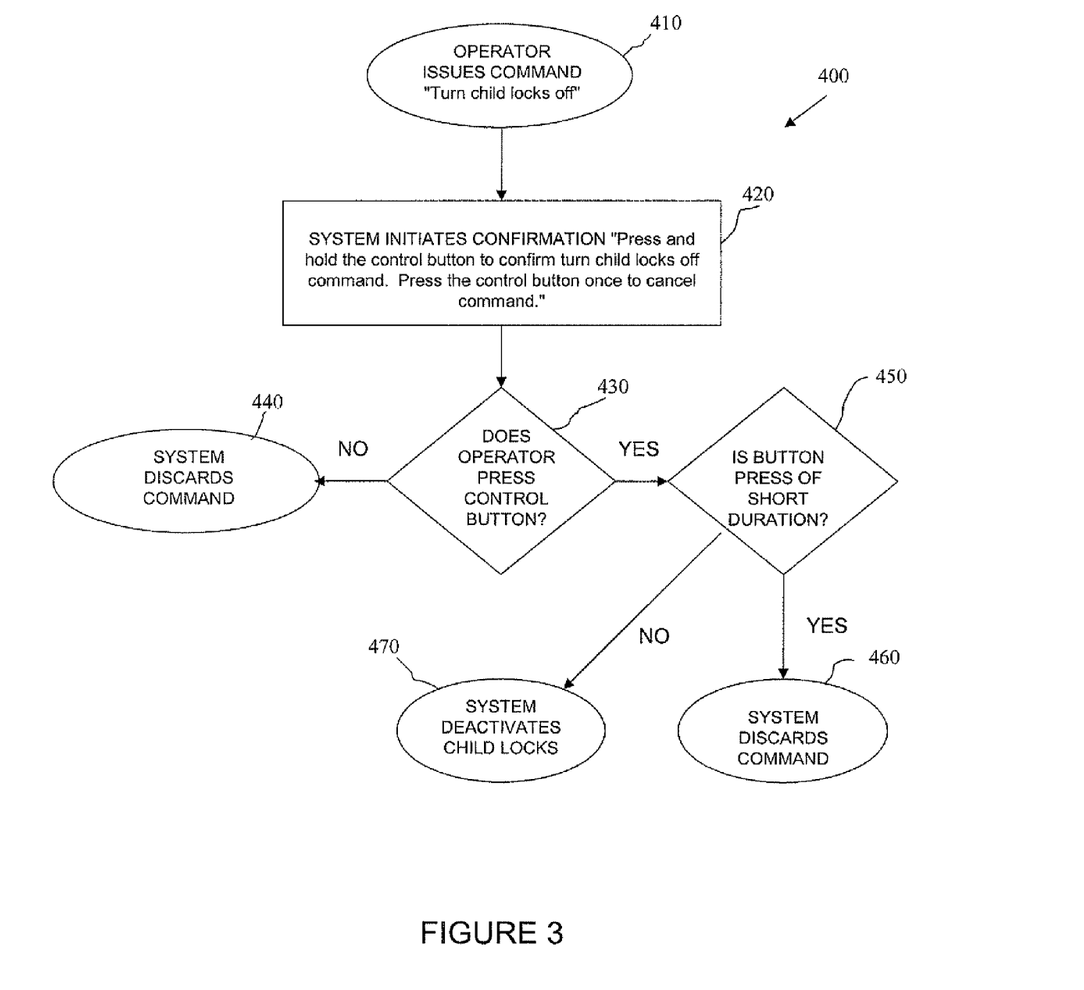
FIG. 3 is a flow chart illustrating another exemplary embodiment of voice interaction that can be carried out by the system of FIG. 1.

Referring to FIGS. 1 and 3, another exemplary embodiment of a confirmation process performed by system 10 is shown and generally referred to by reference numeral 400. In step 410, a command is issued by the operator to turn off the child safety locks. The determination of the identity of the user being the operator can be accomplished as described above with respect to step 330 of FIG. 2 or other identification processes can be utilized.

In step 420, the system 10 determines the confirmation criteria and indicates to the operator, such as through speaker 145, that pressing and holding the control button 150 will confirm the KVSF command to turn the child safety locks off. The system 10 further indicates to the operator that pressing the control button 150 once will cancel this command. The system 10 then waits a specified time period, which can be indicated to the user, to determine whether the confirmation criteria has been satisfied, as in step 430. If there is no confirmation signal provided to the system 10, then the command is discarded as in step 440.

If a signal is sent to system 10, such as a depression of control button 150, then the system in step 450 determines whether the user is cancelling the command, i.e., a short duration pressing of the button, or whether the user is confirming the command, i.e., a long duration pressing of the button. The command can then be discarded as in step 460 or performed as in step 470 based upon the determination by system 10 of whether the confirmation criteria has been satisfied. Of course, the present disclosure contemplates other types of confirmation signals being provided to controller 100 including multiple depressing of the control button 150.

Figure 4:
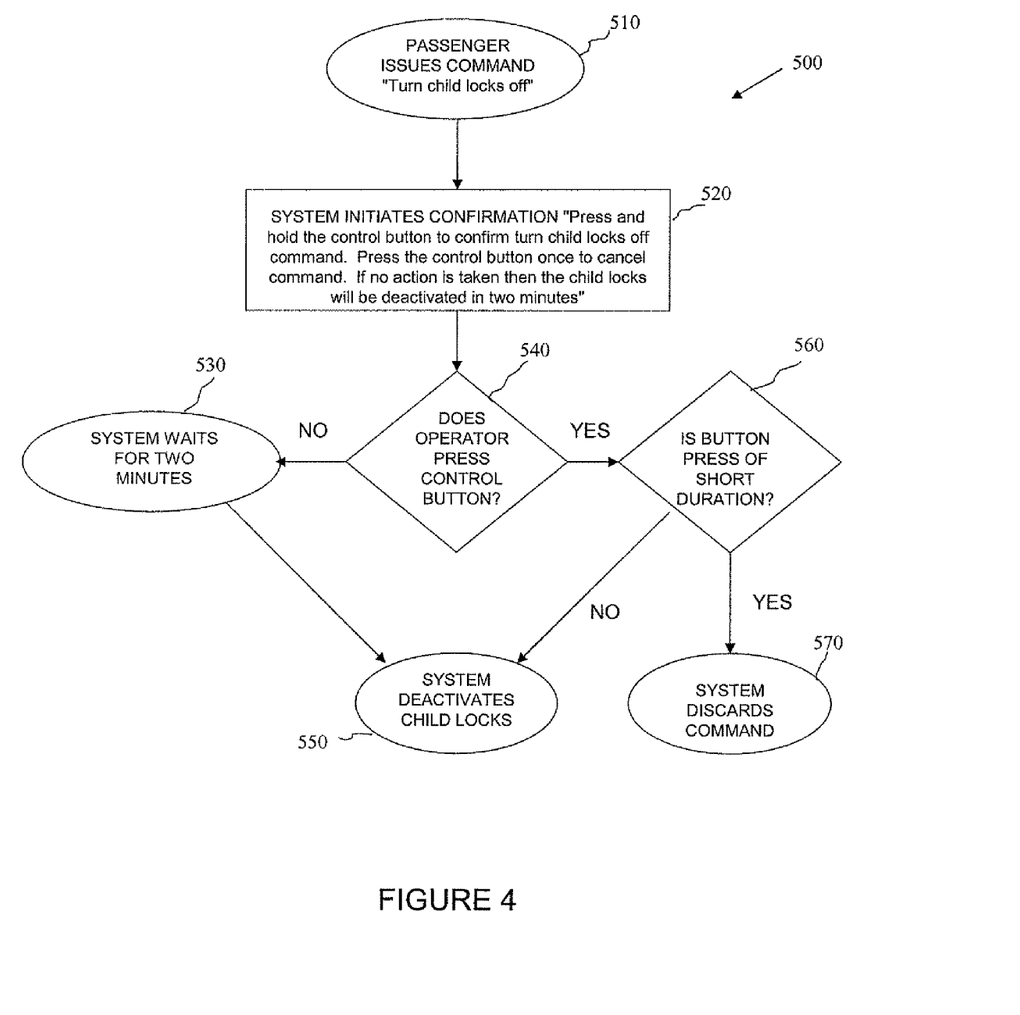
FIG. 4 is a flow chart illustrating another exemplary embodiment of voice interaction that can be carried out by the system of FIG. 1.

Referring to FIGS. 1 and 4, another exemplary embodiment of a confirmation process performed by system 10 is shown and generally referred to by reference numeral 500. In step 510, a command is issued by a passenger to turn off the child safety locks. The determination of the identity of the user being the passenger can be accomplished as described above with respect to step 330 of FIG. 2 or other identification processes can be utilized.

In step 520, the system 10 determines the confirmation criteria and indicates to the operator, such as through speaker 145, that pressing and holding the control button 150 will confirm the KVSF command to turn the child safety locks off. The system 10 further indicates to the operator that pressing the control button 150 once will cancel this command. The system 10 further indicates to the operator that the command will be performed in a specified period of time, e.g., two minutes, if no confirmation signal is received by the system. The system 10 waits the specified time period as in step 530 while monitoring for a confirmation signal as in step 540. If there is no confirmation signal provided to the system 10 within the specified time period then the command is performed as in step 550.

If a signal is sent to system 10, such as a depression of control button 150, then the system in step 560 determines whether the user is cancelling the command, i.e., a short duration pressing of the button, or whether the user is confirming the command, i.e., a long duration pressing of the button. The command can then be discarded as in step 570 or performed as in step 550 based upon the determination by system 10 of whether the confirmation criteria has been satisfied. Of course, the present disclosure contemplates other types of confirmation signals being provided to controller 100 including multiple depressing of the control button 150.

The exemplary embodiment of process 500 has the advantage of allowing for non-operator intervention. Such intervention can be significant where an operator has become incapacitated and unable to confirm a command. In process 500, if an emergency situation has occurred in automobile 50 and the passengers need to exit the automobile from the rear where child safety locks are typically in operation, the passengers can issue the command and safely exit the vehicle after the specified time period once the child safely locks are deactivated. Process 500 still allows the operator to cancel the command through steps 540 and 560 if this is not an emergency situation.

Figure 5:
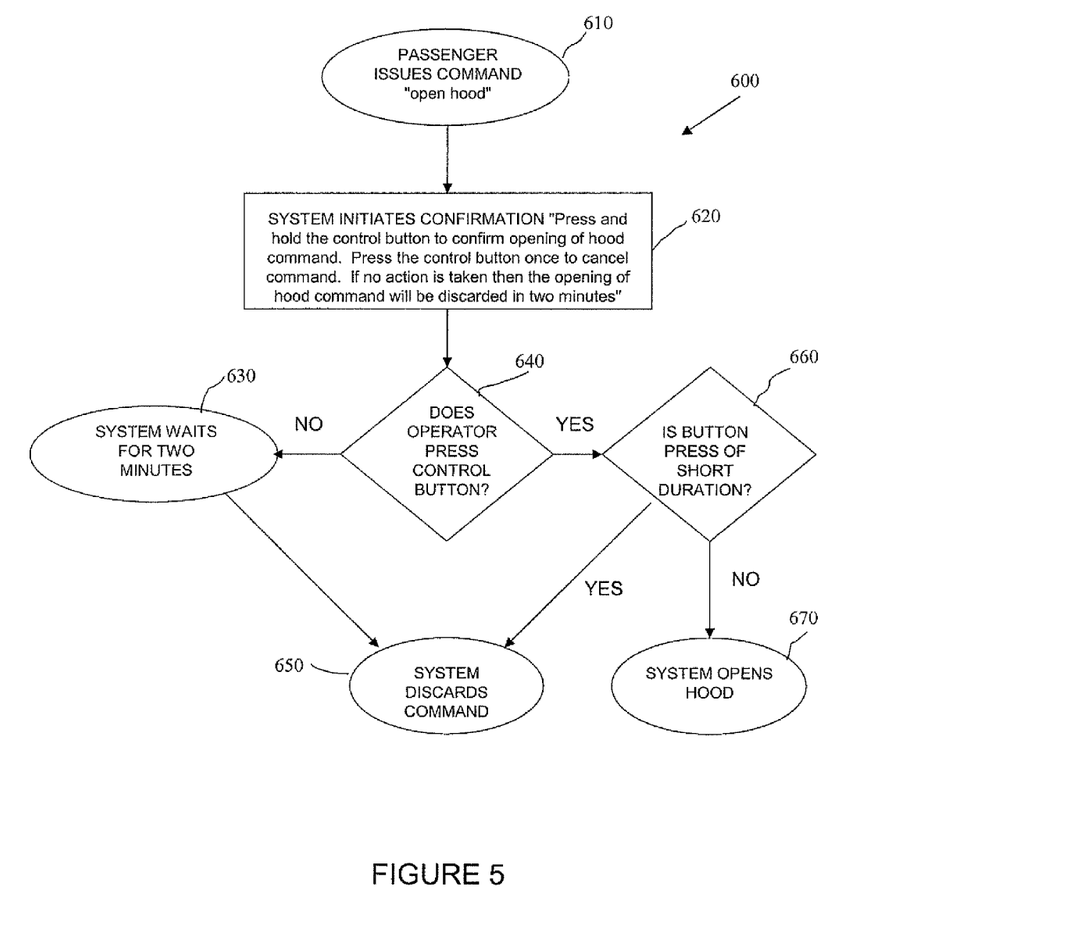
FIG. 5 is a flow chart illustrating another exemplary embodiment of voice interaction that can be carried out by the system of FIG. 1.

Referring to FIGS. 1 and 5, another exemplary embodiment of a confirmation process performed by system 10 is shown and generally referred to by reference numeral 600. In step 610, a command is issued by a passenger to open the hood of the automobile. The determination of the identity of the user being the passenger can be accomplished as described above with respect to step 330 of FIG. 2 or other identification processes can be utilized.

In step 620, the system 10 determines the confirmation criteria and indicates to the operator, such as through speaker 145, that pressing and holding the control button 150 will confirm the KVSF command to open the hood. The system 10 further indicates to the operator that pressing the control button 150 once will cancel this command. The system 10 further indicates to the operator that the command will be discarded in a specified period of time, e.g., two minutes, if no confirmation signal is received by the system. The system 10 waits the specified time period as in step 630 while monitoring for a confirmation signal as in step 640. If there is no confirmation signal provided to the system 10 within the specified time period then the command is discarded as in step 650.

If a signal is sent to system 10, such as a depression of control button 150, then the system in step 660 determines whether the user is cancelling the command, i.e., a short duration pressing of the button, or whether the user is confirming the command, i.e., a long duration pressing of the button. The command can then be discarded as in step 650 or performed as in step 670 based upon the determination by system 10 of whether the confirmation criteria has been satisfied. Of course, the present disclosure contemplates other types of confirmation signals being provided to controller 100 including multiple depressing of the control button 150.

The distinction between the time out action of process 500 and the time out action of process 600 is based at least in part on the type of command being issued. In process 500, the deactivation of child safety locks allows rear seat passengers to exit the vehicle if the operator is unable to confirm the command due to an emergency situation. The need to open the hood based on a command issued by a passenger is less critical and thus process 600 discards the command after the time out period where no confirmation signal is received.

As described above, system 10 can also identify the user or a category of users by other techniques, including biometrics, multiple distributed PTT buttons, speaker verification and voice age determination. For biometric identification, system 10 can include various biometrics components and can apply biometric techniques including finger print scanning, iris pattern analysis and bio-rhythm analysis. Biometric identification techniques are discussed in greater detail in commonly owned U.S. Pat. No. 7,130,452 to Bolle, the disclosure of which is hereby incorporated by reference. Other known speaker identification techniques, including facial recognition and age determination based upon analysis of speech, can be employed by system 10 to determine the user of the system and to determine, at least in part, the confirmation criteria or level that should be employed for the command.

As described in the exemplary embodiments, system 10 provides an operator with instructions to confirm a command, cancel the command and/or one or more notifications that performance of the command will or will not occur if a confirmation signal is not received. It should be understood that the confirmation signal be received by the controller 100 can be in various forms including allowing performance of the command, preventing performance of the command, extending the time period for performance and/or modifying the command. System 10 allows incorporation of voice recognition interactive systems into environments with a greater amount of confidence for the user in the performance of the interactive systems. The exemplary embodiments describe the confirmation criteria being based on at least one of the identification of the user and the type of command being issued. It should be further understood that the present disclosure contemplates other factors being used to determine the confirmation criteria in combination with at least one of the identification of the user and the type of command being issued.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A voice recognition interactive system operably connected to a device, the system comprising:
   at least one processor programmed to;
      receive a voice signal from a user and determine a command based on the voice signal;
      implement a confirmation interface capable of receiving a confirmation signal;
      determine the identity of the user using a user identification process chosen from the group consisting essentially of biometrics, speaker verification, voice age determination and any combinations thereof;

determine a confirmation criteria based at least in part on the identity of the user;

determine if the confirmation criteria has been satisfied; and allow or prevent performance of the command by the device based at least in part on satisfaction of the confirmation criteria.

2. The system of claim 1, wherein the at least one processor is further programmed to determine a type of the command from a predetermined type listing and to determine the confirmation criteria based at least in part on the type of the command.

3. The system of claim 1, wherein the voice signal is a first voice signal, wherein the confirmation interface receives the confirmation signal via a second voice signal, and wherein the system further comprise at least one sound locating device comprising at least one directional microphone to receive the second voice signal.

4. The system of claim 3, wherein the at least one directional microphone comprises a plurality of directional microphones and wherein each of the plurality of directional microphones provides the at least one processor with data representative of the confirmation signal.

5. The system of claim 1, wherein the confirmation interface comprises at least one control pad that can be actuated by the user for providing the confirmation signal to the at least one processor.

6. The system of claim 5, wherein the at least one control pad comprises a Push-To-Talk button.

7. The system of claim 1, wherein the user identifying device performs a user identification process that employs biometrics.

8. The system of claim 1, wherein the user identifying device performs a user identification process that employs speaker verification.

9. The system of claim 1, wherein the user identifying device performs a user identification process that employs voice age determination.

10. The program of claim 1, wherein the at least one processor is further programmed to determine the identification of the user based at least in part on a location of the user.

11. The program of claim 1, wherein the at least one processor is further programmed to allow performance of the command by the device if the user does not provide a cancellation signal within a pre-determined time period.

12. The program of claim 1, wherein the at least one processor is further programmed to prevent performance of the command by the device if the user does not provide a confirmation signal within a pre-determined time period.

13. The program of claim 1, wherein the at least one processor is further programmed to prevent performance of the command by the device if the identification of the user is a primary user and the system receives a cancellation signal from the primary user.

14. An manufacture comprising at least one computer readable storage medium comprising computer readable program instructions for confirming a command in a voice recognition interactive system that is operably connected to a device, said program comprising:

program instructions for causing a computer to determine an identification of a user and/or a type of the command;

program instructions for causing the computer to determine a confirmation criteria for performance of the command based at least in part on the identification of the user and/or the type of the command;

program instructions for causing the computer to allow or prevent the performance of the command by the device based at least in part on satisfaction of the confirmation criteria;

program instructions for causing the computer to determine the identification of the user based at least in part on a location of the user;

program instructions for causing the computer to prevent performance of the command by the device if the identification of the user is a primary user and the computer receives a cancellation signal from the primary user.

15. A method of voice recognition interaction with a device, the method comprising:

receiving a voice signal from a user;

determining, via a computer system, a command to be performed by the device based on the voice signal;

determining an identity of the user and/or a type of the command to be performed;

determining a confirmation criteria based at least in part on the identity of the user and/or the type of the command to be performed, wherein the confirmation criteria comprises an operator override if the type of the command is a key voice system function; and allowing or preventing performance of the command by the device based on satisfaction of the confirmation criteria, wherein allowing or preventing performance of the command comprises allowing performance of the command by the device if the user does not provide a cancellation signal within a pre-determined time period or preventing performance of the command by the device if the user does not provide a confirmation signal within the pre-determined time period.

16. The method of claim 15, wherein the confirmation criteria is determined based on both the identity of the user and the type of the command to be performed.

17. The method of claim 15, wherein the confirmation criteria comprises an operator override if the type of the command is a key voice system function.

18. The method of claim 15, wherein the identity of the user is determined by an identification process chosen from the group consisting essentially of a user location, biometrics, speaker verification, voice age determination and any combinations thereof.

19. The method of claim 15, further comprising indicating to the user the confirmation criteria to be satisfied.

20. The method of claim 15, wherein the allowing or preventing performance of the command by the device further comprises allowing performance of the command by the device if the user does not provide a cancellation signal within a pre-determined time period or preventing performance of the command by the device if the user does not provide a confirmation signal within the pre-determined time period.

* * * * *

UNITED STATES PATENT AND TRADEMARK OFFICE
CERTIFICATE OF CORRECTION

PATENT NO. : 7,747,446 B2  Page 1 of 1
APPLICATION NO. : 11/609667
DATED : June 29, 2010
INVENTOR(S) : Oscar J. Blass et al.

It is certified that error appears in the above-identified patent and that said Letters Patent is hereby corrected as shown below:

At column 11, claim 14, line 57, please replace "An manufacture" with -- An article of manufacture --.

Signed and Sealed this

Seventeenth Day of August, 2010

David J. Kappos
*Director of the United States Patent and Trademark Office*